United States Patent [19]

Lux et al.

[11] Patent Number: 4,669,163
[45] Date of Patent: Jun. 2, 1987

[54] POLYOLEFIN FIBER ROLL

[75] Inventors: Ronald E. Lux, White Bear Lake; Eugene J. Miller, Maplewood, both of Minn.

[73] Assignee: Minnesota Mining and Manufacturing Company, St. Paul, Minn.

[21] Appl. No.: 906,597

[22] Filed: Sep. 10, 1986

Related U.S. Application Data

[63] Continuation-in-part of Ser. No. 808,111, Dec. 12, 1985.

[51] Int. Cl.⁴ .......................... B21B 31/08; B60B 7/04
[52] U.S. Cl. ........................................ 29/125; 29/130; 29/132; 29/148.4 D
[58] Field of Search ................ 29/123, 124, 132, 125, 29/130, DIG. 25, DIG. 1, 428, 458, 527.2, 526 R, 148.4 D

[56] References Cited

U.S. PATENT DOCUMENTS

| | | | |
|---|---|---|---|
| 2,186,679 | 1/1940 | Lade | 29/132 |
| 2,801,461 | 8/1957 | Kusters | 29/120 |
| 3,853,677 | 12/1974 | Kai | 29/132 |
| 4,283,821 | 8/1981 | Paakkunainen | 29/132 |

OTHER PUBLICATIONS

L. W. Legacy "Recent Advances in Wringer Roll Technology" in *Iron and Steel Engineer* vol. 60, No. 4, Apr., 1983, pp. 42–44.

Wente, Van A., "Superfine Thermoplastic Fibers", Industrial Engineering Chemistry, vol. 48, pp. 1342 et seq (1956).

Report Number 4364 of the Naval Research Laboratories, published May 25, 1954 entitled "Manufacture of Superfine Organic Fibers" by Wente, V. A., Boone, C. D. and Flugharty, E. L.

*Primary Examiner*—Mark Rosenbaum
*Assistant Examiner*—Irene Graves Golabi
*Attorney, Agent, or Firm*—Donald M. Sell; James A. Smith; Richard Francis

[57] ABSTRACT

Acid- and caustic- resistant rolls are prepared by forming a nonwoven web of randomly laid entangled polyolefin fibers, stacking a multiplicity of segments of the web into a pile, compacting the pile under a compaction force equivalent to a room temperature compaction force of about $20 \times 10^5$ to $55 \times 10^5$ Pa, restraining the pile on its compacted configuration, and, if needed, dressing the sides of the compacted pile to form a smooth cylindrical surface. The preferred polyolefin fibers are formed of polyethylene, polypropylene or polybutylene.

14 Claims, 3 Drawing Figures

POLYOLEFIN FIBER ROLL

This is a continuation-in-part of application Ser. No. 808,111 filed Dec. 12, 1985.

DESCRIPTION

1. Technical Field

This invention relates to rolls made of compacted sheets of fabric and to a method of making the same.

2. Background Art

Rotatable surface treating rolls are commonly used in the manufacture of metal sheet or metal coil. Such rolls are utilized to squeegee the surface of the metal sheet or to apply any of numerous solutions which are used to clean, pickle, rinse, conversion coat, and oil the surface of the metal sheet. Rubber rolls have been used for this purpose for a long period of time even though they have a relatively short useful life because the rubber roll surface is easily damaged, requiring frequent surface dressing or replacement. The surface of the rubber roll is easily torn, gouged or cut by the edges of the splices in the metal sheet. Once the rubber roll has been damaged, cuts, tears, and gouges will enlarge due to compaction at the nip which typically causes a small cut, tear, or gouge to propagate.

Over the past several years, rolls made of compacted sheets of fabric have been introduced and found to be superior to rubber rolls. The so called fabric rolls have an improved squeegee action, resistance to damage induced by the coil edge or splice, and useful life. For the most part, fabric rolls have been found to be stronger, more tear-resistant, more cut-resistant, and, even when damaged, typically self heal.

While the fabric rolls typically have a longer useful life than the rubber rolls, they are for the most part susceptible to damage when exposed to very harsh chemical environments such as acids, caustic liquids, and electro-plating solutions. In the manufacture of metal sheet, a wide variety of very harsh aqueous chemical agents are typically used. After the chemical treating agents have interacted with the surface of the metal sheet, these agents must be removed substantially completely by squeegeeing and then water rinsing followed by another squeegeeing operation. Many of these treating agents contain relatively high concentrations of hydrochloric, sulfuric, and chromic acids and their salts or basic agents such as relatively high concentrations of sodium or potassium hydroxide. These solutions typically have a pH which could be less than one and as high as 14. At these extreme pH values many organic polymeric materials typically used for rolls will degrade or disintegrate.

Various references disclose the preparation of fabric rolls which may suggest the use of more acid and caustic resistant materials among less resistant materials. None, however, suggests how to prepare a useful roll of such resistant materials which has the desirable properties which make it useful as a squeegee or surface treatment roll in these harsh environments. Following the general methods of preparation of these references will not produce a roll of acid and caustic resistant material having the desired chemical resistance and the proper hardness, durability, self-healing nature and other desirable properties for a sheet metal finishing roll.

Illustrative of the prior art is the following:

Kusters (U.S. Pat. No. 2,801,461) discloses a roll made of a plurality of flat, angular, axially compressed discs mounted and retained under compression on a support shaft. The discs are composed of nonwoven fibers bonded with vulcanized latexes. The fibers include tensilized nylon, natural fibers such as ramie, cotton, or sisal-hemp.

Kai (U.S. Pat. No. 3,853,677) discloses a roll made from axially compressed discs of a nonwoven fabric formed from a mixture of natural fibers and fibers made from a high molecular weight synthetic polymer wherein the fibers are bonded with a resinous material. The discs are heated compressed at $78 \times 10^6$ Pa to form a finished roll having a Poisson,s ratio of about 0.5 and shearing stress of about 1200 kg/m$^2$. This patent is, however, unclear as to the method of measurement of these properties and their significance.

L. W. Legacy in an article entitled "Recent Advances in Wringer Roll Technology" in *Iron and Steel Engineer,* Vol. 60, No. 4, April, 1983, pp. 42–44, discloses the preparation of rolls made of compacted discs of nylon staple fibers bonded with a strong flexible binder resin. Legacy reports these rolls to be more tear and cut resistant than conventional rubber covered rolls and to be self-healing after exposure to large local stresses. The article cautions, however, that the rolls may not be used outside of a pH range of 2 to 10 because below pH 2 the fibers dissolve and above pH 10 the binder resin binding the fibers together dissolves.

SUMMARY OF THE PRESENT INVENTION

The present invention provides a polyolefin fiber roll that is resistant to physical damage and resistant to very harsh aqueous chemical environments which can range from pH less than about 1 to pH about 14. The fiber rolls of the present invention effectively squeegee liquids from the surface of a metal strip even after being physically damaged. The roll of the present invention comprises a cylindrical body supported on its cylindrical axis for rotation. The body comprises a compacted pile formed of a multiplicity of like-oriented disc elements of nonwoven, randomly laid, entangled, polyolefin fibers. The compacted pile is characterized by being compacted under a compaction force eqivalent to a room temperature compaction force between $20 \times 10^5$ to about $55 \times 10^5$ Pa. Rolls produced under such compaction force will have a compacted roll body density in the range of about 430 to about 600 kg/m$^3$.

The roll of the invention is prepared by a novel process which comprises the steps of:

(a) forming an integrated nonwoven web of randomly laid entangled chemically resistant polyolefin fibers;

(b) stacking a multiplicity of segments of the nonwoven web into a pile;

(c) compacting the pile under a compaction force equivalent to a room temperature compaction force within the range of about $20 \times 10^5$ to $55 \times 10^5$ Pa;

(d) restraining the pile in its compacted configuration by restraining means; and (e) if needed, dressing the sides of the compacted pile to form a smooth cylindrical surface.

The nonwoven web may be integrated by bonding contacting polyolefin fibers or by needle tacking. The room temperature compacting force may be obtained by compacting the pile at room temperature under a force of $20 \times 10^5$ to $55 \times 10^5$ Pa or by first heating the pile to a temperature below the melting temperature of the fiber, e.g., to 80° C., and applying a lesser force to achieve the same degree of compaction. At 80° C., the compaction force would be about one half of that applied at room temperature. Such a fraction would vary, however, depending upon the amount of heating from near one at slightly above room temperature to about ¼ nearer to the melting temperature of the fibers.

The preferred polyolefin forming the fibers is selected from the group consisting of polyethylene, polypropylene and polybutylene. The fibers preferably have a tenacity greater than about 1 gram per denier. Preferred polyolefin fibers have a size on the order of 1 to 50 denier.

DESCRIPTION OF THE DRAWINGS

The details of the invention will become more apparent with information presented in the drawings, the description of the drawings, detailed description of the invention and examples.

DETAILED DESCRIPTION

Figure 1:
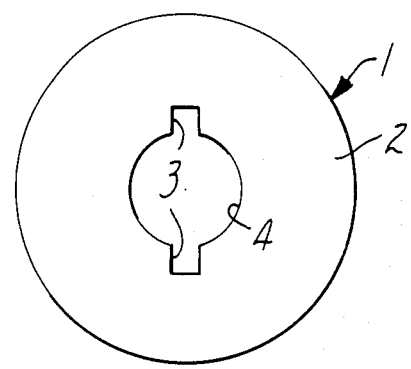
FIG. 1 shows a top plan view of a disc-shaped web segment used to make the roll of the invention.
Figure 2:
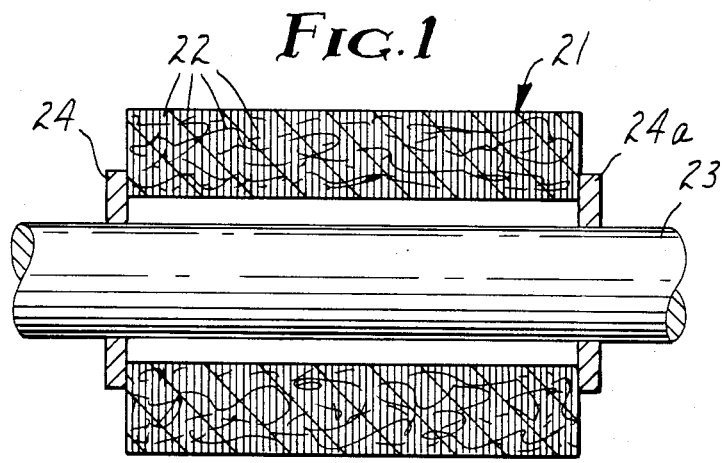
FIG. 2 is a cross-sectional view of a roll made in accordance with the present invention on a keyed shaft which is not shown in sections.
Figure 3:
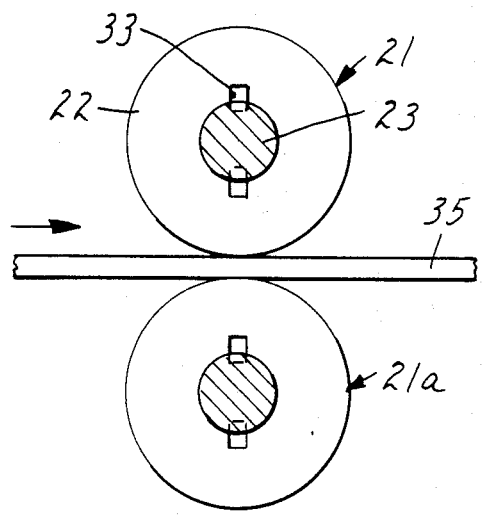
FIG. 3 is an end view of a pair of cooperating rolls of the invention having therebetween a strip of material.

Referring now to the drawing, in particular FIG. 1, a plurality of discs, such as disc 1, are die cut from a nonwoven web 2. Disc 1 is an annulus having a centered opening 4 which may have opposed slots 3 to fit over a key element on a support shaft. Discs 1 are stacked into a pile which is compacted at room temperature under a force in the range of about $20 \times 10^5$ to $55 \times 10^5$ Pa and the compacted pile is restrained in its compacted configuration. This compaction may be accomplished by placing discs 1, as shown in FIG. 2, on a support shaft 23 which may include one or more keys 33, slots or appendages to prevent the roll body from rotating on the shaft, and whereon they are compacted with sufficient force to achieve the desired compaction whereupon the compacted discs 22 are restrained to form roll 21. The compacting force may be applied by a suitable pressing device (not shown). The compacted pile of discs may be restrained by any suitable means, e.g., adhesive bonding, or by being held in place by mechanical means such as by locking collars or flanges 24, and 24a which are adapted to be slidable on and mechanically engagable with shaft 23. Alternatively, the discs may be mounted, compacted and then restrained on a hollow open-ended tube (not shown) of adequate strength to withstand compacting and having an opening therethrough to permit mounting onto the support shaft. As shown in FIG. 3, roll 21 and a different or similar roll 21a may be used in a two roll set to treat a strip of material such as metal sheet 35.

The preferred roll of the invention has a precompressed, adhesively bonded, integrally formed cylindrical body. The molding method of such a precompressed roll has the advantage in that it yields a dimensioned roll body which requires little subsequent finishing. The resultant roll body, after molding, may be forced onto a support shaft, the periphery of the roll body dressed, e.g., by light grinding, yielding a ready to use roll. Such a precompressed roll can be easily made according to desired dimensions by stacking the discs in the presence of suitable curable adhesive binder on a removable mandrel, placing this assembly in a mold, compressing the stack to the required degree, curing the binder (e.g., by heating) to maintain the compacted structure, removing the assembly from the mold and removing the mandrel. Such a process produces a roll as a cylinder with a central opening along its cylindrical axis having a shape corresponding to the shape of the removable mandrel. The mandrel may be round, square or otherwise shaped and may include appendages to provide key slots in the central opening. The cylindrical roll body may then be readily placed onto an appropriately shaped support shaft and held in place by suitable means such as locking collars. A spent roll body is also easily forced from the support shaft prior to mounting a new roll. The support shafts may have varied lengths depending upon the desired face width of the roll. Longer roll structures may be formed by combining shorter cylindrical roll bodies as those described on the same shaft.

After compaction of the discs and formation of the roll, surface dressing is usually required to obtain a relatively smooth cylindrical surface. Such surface dressing is usually accomplished by use of conventional devices for this purpose, such as by use of a grinder, skiving knife or other means.

The integrated nonwoven fabrics from which the discs are cut may be formed of crimped staple fibers or may be formed by other techniques, e.g., as a spun bonded fabric. The fibers used to make the nonwoven fabric from which the discs are cut to form the roll of the invention are produced from polyolefin polymers. The fibers are selected to be resistant to acidic and basic aqueous liquids at moderately elevated temperatures and to have adequate physical strength. Preferably polyolefin fibers which have adequate strength have a tenacity of greater than 1 gram per denier. Polyethylene, polypropylene and polybutylene are examples of preferred polyolefin.

The fiber diameter of the polyolefin fibers is relatively important. Rolls made with excessively fine fibers will not provide adequate resistance to physical damage and excessively coarse fibers will fail to provide an adequate squeegee action. Polyolefin fibers having a denier of about 1 to about 50 are preferred. The most preferred fiber size is about 1 to about 30 denier. The fiber length can be virtually continuous, as in the case of spunbonded webs, or of finite length, as in the case of crimped staple fiber employed to make a web. Crimped staple fibers having a length of about 25 to 100 mm have been found to be useful to process in conventional web-forming equipment to form the nonwoven webs. The crimped staple fibers need be only slightly crimped to accomplish web formation and enhanced web strength for process handling the unbonded web.

The fibers of the nonwoven webs from which the rolls of the invention are formed are integrated or stabilized, e.g., by adhesive bonding and/or needle tacking so as to make the rolls resistant to deformation and physical damage. Bonding agents are applied in an amount at least sufficient to bond adjacent fibers together to stabilize the fibers in the disc without filling the web porosity to such a degree as to interfere with the operation of the roll or produce an undesirable hardness or compressibility. In the case of unified rolls, adhesive bonding agent may also bond the discs to form an integral roll. The bonding agents used to bond the discs may be the same as or different from the bonding agents employed to bond the fibers in the web. In addition to having the ability to adherently bond the fibers and/or the discs together, the bonding agent when cured, must be chemically resistant to very harsh aqueous chemical treating agents having a pH of less than one and as high as 14. Useful bonding agents include adhesive materials which preferably are introduced in the form of melt-bondable fibers in the nonwoven web or in other forms, water- or solvent-based adhesives, thermosetting adhesives( and the like.

Spunbonded polyolefin nonwoven fibrous webs that are useful in this invention are autogeneously bonded and are preferably strengthened by needle tacking. The preparation of spunbonded nonwoven webs is well known and spunbonded webs of polyolefin fibers are commercially available. Needle tacking is also a well known technique wherein barbed or felting needles are forced into a web to cause further entanglement of fibers. Spunbonded polypropylene nonwoven needle tacked webs, when appropriately compacted, e.g., by needle tacking and restrained, e.g., by adhesive bonding, provide useful web discs which may be compacted to form the rolls of the invention. When making the more preferred unified rolls of the invention, the spunbonded polypropylene nonwoven web is combined with an additional bonding agent prior to compacting the discs of the spunbonded.web. The additional bonding agent is then activated to unify the nonwoven roll.

The additional bonding agents also have resistance to harsh aqueous chemical treating agents and are capable of adherently bonding to the polyolefin fibers. The additional bonding agents may be melt-bondable materials, liquid curable adhesives, solvent or water borne polymer adhesives, latexes and the like. The melt-bondable materials are useful in any of a variety of forms, such as bicomponent melt-bondable fibers, powders, coatings, and melt-bondable microfibers. Bicomponent melt-bondable fibers are especially useful when formed into a nonwoven web on the surface of the spunbonded polyolefin nonwoven web, followed by needle tacking the melt-bondable fiber into the spunbonded web. Similarly a web of blown microfibers can be collected on the surface of the spunbonded nonwoven web and similarly needle tacked.

Useful melt-bondable materials include those made of polyethylene and other adherent, chemically resistant materials having a melt-bond temperature below the melt temperature of the spunbonded nonwoven web. Microfiber webs can be prepared by the method described in Wente, Van A., "Superfine Thermoplastic Fibers", Industrial Engineering Chemistry, Vol. 48, pp. 1342 et seq (1956), and Report Number 4364 of the Naval Research Laboratories, published May 25, 1954 entitled "Manufacture of Superfine Organic Fibers" by Wente, V. A., Boone, C. D. and Flugharty, E. L.

Polymeric adhesives were found especially useful as adherent additional bonding agents. An acrylonitrile and butadiene copolymer such as that sold under the trade designation "Hycar" 1472, commercially available from B. F. Goodrich, is an example of such a material. In addition to being adherent, these adhesives contribute additional strength and elasticity to the roll which enhances its life, resiliency, and resistance to damage, and improves its squeegee efficiency.

The preferred melt-bondable fibers are side-by-side polyethylene/polypropylene bi-component fibers, commercially available from Chisso Corporation under the trade designation of "Chisso" Type ES fibers.

EXAMPLES

Rolls made according to the present invention are described in the following examples and compared to control examples prepared in a similar manner but with compaction pressures outside the room temperature compaction force range of $20 \times 10^5$ Pa to $55 \times 10^5$ Pa. It will be noted that rolls made with a compaction pressure of less than about $20 \times 10^5$ Pa have less resistance to fatigue. Apparently, these rolls deform repeatedly during use by compression forces at the roll nip. The repeated deformation causes fatigue, fiber loss, and resultant shortened useful life. It will also be noted that rolls made at compaction pressures greater than about $55 \times 10^5$ Pa are harder, denser and less resistant to permanent damage. Apparently, the harder, denser rolls do not have sufficient deformability to respond to severe localized stresses without yielding in a nonrecoverable manner.

The following examples are illustrative of the invention and include a description of preferred embodiments. Web Examples 1-12 describe nonwoven webs that will be subsequently used to fabricate rolls of the invention. In Web Examples 1-11 additional bonding agent are combined with the pre-formed, bonded nonwoven webs.

WEB EXAMPLE 1

A 3 mm thick 630 mm wide segment of nonwoven web available from Crown Zellerbach Co. under the trade designation Grade 400 "Fibretex" geotextile web consisting of spunbonded, crosslapped and needle punched polypropylene fibers and approximately 8 denier polypropylene fibers and having a web weight of 420 g/m², was needle tacked to an air laid nonwoven web of melt bondable fibers. Using a web forming machine available under the trade designation "Rando-Webber", the air laid nonwoven web was formed from 3 denier, 38 mm long, melt-bondable fibers available from Chisso Corporation (Japan) under the trade designation "Chisso" Type ES fibers into a 50 mm thick web having a weight of about 140 g/m². Each melt-bondable fiber was a bi-component structure in a side-by-side orientation consisting of approximately 67% polyethylene melting at about 130° C. on one side and 33% by weight polypropylene of a higher melting temperature on the other side. The juxtaposed air laid and "Fibretex" webs were passed at a rate of 2.1 m/min. through a needle tacker machine fitted with a multiplicity of $15 \times 18 \times 36 \times 3\frac{1}{2}$ RB Foster felting needles spaced evenly 13 mm apart on a needle board. The needles penetrated 17 mm into the stacked webs and made 600 penetration cycles per minute to produce 50 penetrations per cm². After needle punching, some of the melt-bonded fibers protruded through the "Fibretex" web and the resultant composite web was about 5 mm thick and weighed about 600 g/m².

WEB EXAMPLES 2-5

Web Examples 2-4 were made using the "Fibretex" base web and air laid web as described in Web Example 1 except the amount of bondable fiber was reduced in Examples 2 and and increased in Example 4. Example 5 was similar to Web Examples 1-4 except the air laid web was not needle tacked into the "Fibretex" web. Table I below gives details of the nonwoven webs of Web Examples 1-5 and of Web Examples 6-12 which follow.

WEB EXAMPLE 6

A web forming machine available under the trade designation "Rando-Webber" was used to air lay onto the "Fibretex" nonwoven web described in Example 1 a layer of 3 denier, 40 mm long bicomponent melt bondable fibers, each fiber of which had a lower melting polyethylene sheath around a higher melting polypropylene core. The melt bondable fibers are those commercially available from Daiwabo Company, Ltd. under the trade designation "Daiwa" NBF. The two webs were then needle tacked as described in Web Example 1.

WEB EXAMPLE 7

A 13 g/m$^2$ polyethylene blown microfiber (BMF) nonwoven web was formed directly onto the surface of the "Fibretex" nonwoven web described in Example 1. The BMF microfiber web was formed by melt blowing polyethylene polymer following the procedure described by the aforementioned Naval Research Laboratory article using polyethylene obtained from the Eastman Chemical Company under the trade designation "Epolene" C10P polyethylene powder.

WEB EXAMPLE 8

Using a "Rando Webber" machine, a 190 g/m$^2$ air laid nonwoven web was formed from 3 denier "Chisso" Type ES bicomponent fibers and the resultant web was compacted by needle tacking using the equipment and needle tacking method described in Web Example 1.

WEB EXAMPLE 9

The "Fibretex" web of Example 1 was melt coated on one surface with 17 g/m$^2$ of a polypropylene blended hot melt adhesive, commercially available from Minnesota Mining and Manufacturing Co. under the trade designation "3M" adhesive EC3797 using a heated two roll coater having an upper knurled roll with 6 lines per cm and a doctor blade that metered the molten melt adhesive onto the top knurled roll. The coating was then allowed to cool.

WEB EXAMPLE 10

The "Fibretex" web of Web Example 1 was spray coated one surface with a 10% solids solution of a medium-high molecular weight acrylonitrile and butadiene copolymer available from B. F. Goodrich Company under the trade designation "Hycar" 1472 in "Cellosolve" acetate solvent. The coated web used to make discs for the roll was heated at a temperature of 150° C. to remove all but 7% of the "Cellosolve" acetate solvent, leaving the web wet to the touch. The dry coating weight was 38 g/m$^2$.

WEB EXAMPLE 11

The "Fibretex" web of Web Example 1 was coated throughout using a two-roll coater to apply an ethylene acrylic acid copolymer 25% solids latex commercially available from the Dow Chemical Company under the trade designation "Primacor" Dispersion 4983. The coating was dried in an oven at 150° C. to remove water, resulting in a dry coating weight of 140 g/m$^2$.

WEB EXAMPLE 12

The "Fibretex" web as described in Example 1 was formed into a roll without further modification or bonding.

TABLE I

NONWOVEN WEBS

| Web Ex. | 420 g/m$^2$ "Fibretex" Web | Bondable Component Material | g/m$^2$ | Needled |
|---|---|---|---|---|
| 1 | Yes | "Chisso" Type ES fiber | 140 | Yes |
| 2 | " | " | 105 | " |
| 3 | " | " | 70 | " |
| 4 | " | " | 190 | " |
| 5 | " | " | 140 | No |
| 6 | " | "Daiwa" NBF Bicomponent Fiber | 140 | Yes |
| 7 | " | Polyethylene BMF Fiber | 13 | No |
| 8 | No | "Chisso" Type ES Fiber | 190 | Yes |
| 9 | Yes | Polypropylene Hot Melt | 17 | No |
| 10 | " | "Hycar" 1472 Binder | 38 | " |
| 11 | " | "Primacor" Dispersion 4983 | 140 | " |
| 12 | " | None | — | — |

ROLL EXAMPLES 13-32

In Roll Examples 13-32, the webs described in Web Examples 1-12 were cut into 165 mm in diameter discs with a 51 mm center hole as depitcted in FIG. 1. The holes included two symmericaly oposed slots, 13 mm by 13 mm square, into the discs which will mate with drive keys located on a support shaft. About 60-100 discs per 100 mm of finsihed roll width were placed on a 50 mm diameter shaft having two 13 mm by 13 mm drive keys which indexed the slots in the discs. In the case of Roll Examples 19, 20, 22, 24 and 25, care was taken to orient all the discs in the same face to back manner. The discs were compressed using the force reported in Table II to form a 235 mm long roll. In Roll Examples 13-26 flanges were temporarily secured to the shaft to restrain the compressed discs and a paper backed pressure sensitive adhesive masking tape was wound spirally with the adhesive side out around the compressed discs for temporary protection. The compressed discs were then placed in an air convection oven at 135° C. (Roll Example 25 at 80° C.) for 9 hours to cause the bondable component of the compressed discs to bond the discs together to form a unified roll. The roll was then allowed to cool for 6 hours at room temperature after which time the retaining flanges, shaft and temporary tape outer wrapping were removed. Roll Examples 27-32 had no added bondable material so the compressed discs were restrained by the flanges to maintain the compacted state. No heat was applied during the compaction of the discs forming Roll Examples 27-32. Table II identifies the Web Examples used to make the rolls of Roll Examples 13-32, the force required to compact the discs to form the roll, the compaction force at room temperature, and the density of the resultant compacted roll.

TABLE II

| Roll Ex. | Web Ex. | Roll Compression Force, 10$^3$ N | Compaction Pressure 10$^5$ Pa | Density kg/m$^3$ |
|---|---|---|---|---|
| 13 | 1 | 54 | 28 | 490 |
| 14 | 2 | 57 | 30 | 490 |
| 15 | 3 | 55 | 29 | 490 |
| 16 | 1 | * | * | 580 |
| 17[1] | 4 | 18 | 10 | 400 |
| 18 | 1 | * | * | 400 |
| 19 | 5 | * | * | 400 |
| 20 | 5 | 98 | 51 | 550 |
| 21 | 6 | 39 | 20 | 490 |
| 22 | 7 | 50 | 26 | 490 |
| 23 | 8 | * | * | 580 |
| 24 | 9 | 49 | 26 | 490 |

TABLE II-continued

| Roll Ex. | Web Ex. | Roll Compression Force, $10^3$ N | Compaction Pressure $10^5$ Pa | Density kg/m$^3$ |
|---|---|---|---|---|
| 25 | 10 | 42 | 22 | 490 |
| 26 | 11 | 84 | 44 | 580 |
| 27[1] | 12 | 26 | 14 | 400 |
| 28 | 12 | 35 | 18 | 430 |
| 29 | 12 | 52 | 27 | 460 |
| 30 | 12 | 59 | 31 | 490 |
| 31 | 12 | 93 | 49 | 550 |
| 32[1] | 12 | 147 | 77 | 610 |

*not measured
[1] Control example

PERFORMANCE TEST

Prior to evaluation, each roll was deressed by rotating the roll at about 60 rpm while a grinding wheel formed of 36 grade abrasive operating at 28 m/second was held and traversed against the rotating roll to produce a smooth cylindrical surface. If required, the roll can be defuzzed by applying sandpaper, e.g., of grade 400 abrasive, against the rotating roll. Prior to performance testing of the dressed roll, the Shore A2 Durometer was measured at room temperature and reported as "dry" durometer in Table III. One performance test evolved using test rolls to continuously squeegee hot water from the surface of a mating steel roll. Also, the test roll was intentionally damaged so as to evaluate the ability of the roll to heal in the damaged area and again squeegee effectively.

SQUEEGEEING EFFICIENTY TEST

The test roll was evaluated for its ability to squeegee effectively by mounting it as the top roll in a two-roll set with the bottom roll being a 200 mm diameter steel roll which was power driven at a speed of 185 m/min. The test roll was forced against the smooth, polished steel roll at $1.3 \times 10^4$ N/m. The bottom steel roll was immersed in a hot water bath maintained at 82° C. After rotating the rolls for 2 hours, both rolls were hot and the test roll was thoroughly wet. A paper towel, weighing about 5 g was folded to yield an 8 layer structure which was 95 mm wide. After weighing the paper towel, it was folded over the edge of a 95 mm wide spatula and then the folded edge was gently but firmly held against the bottom steel roll for 5 seconds. This process was repeated five times, each time with a new towel, after which the towels were again weighed and the average weight of water pickup calculated. Less water picked up by the towel indicated less water passed by the squeegee roll.

FATIGUE TEST

The performance of the test rolls was evaluated after being controllably damaged by simulating some of the severe conditions that might be encountered in steel strip processing lines. To damage the test roll, a "chopper blade" (a triangular shaped piece of steel) was secured with tape to a steel roll of a two roll set which included the test roll and the steel roll. The "chopper blade" was formed from a triangular shaped piece of cold rolled steel about 1.5 mm thick. The triangular piece of steel was approximately 75 mm by 75 mm by 100 mm and had four pointed protrusions on each 75 mm edge. The protrusions were formed from the metal triangle by bending at a right angle a cut segment of that edge. All protrusions were nearly the same shape and size and were 5 mm high. The test roll and the steel roll were then forced together under a force of $2.6 \times 10^3$ N for one minute. The chopper blade was then removed and the test roll operated for one hour at $1.3 \times 10^4$ N/m to allow the test roll to "heal" prior to evaluation of the squeegeeing efficiency. The amount of water passed by the rolls was again measured using the previously described method. The Shore A2 Durometer of the hot wet roll was measured taking care to avoid measuring in an area of roll damaged by the "chopper blade". The test rolls were then removed from the tester, the support shaft removed and the roll allowed to dry for several days. The test rolls were forcibly separated near the center to expose the major surface of one of the compacted discs. The depth of deformation of the roll periphery was measured and recorded as fatigue. The results of these evaluations are reported in Table III below.

TABLE III

| | | Mill Roll Performance Tests | | | | |
|---|---|---|---|---|---|---|
| | | Durometer | | Water Passage, g | | |
| Ex. | Density Kg/m$^3$ | Shore Dry | A2 Wet | Before Damage | After Damage | Fatigue, mm |
| 13 | 490 | 97 | 79 | 0.86 | 1.34 | None |
| 14 | 490 | 100 | 82 | 0.50 | 1.34 | " |
| 15 | 490 | 95 | 84 | 0.53 | 1.56 | " |
| 16 | 580 | 100+ | 98 | 0.08 | 2.63 | " |
| 17 | 400 | 89 | 68 | 1.96 | 2.13 | 12 |
| 18 | 400 | 81 | 64 | 1.87 | 2.61 | 24 |
| 19 | 400 | 86 | 63 | 2.76 | 2.82 | 18 |
| 20 | 550 | 100+ | 82 | 0.23 | 2.84 | 8 |
| 21 | 490 | 100+ | 92 | 0.47 | 1.45 | None |
| 22 | 490 | 100+ | 75 | 0.54 | 1.26 | " |
| 23 | 580 | 72 | 81 | 1.05 | 1.74 | " |
| 24 | 490 | 90 | 81 | 1.09 | 1.86 | " |
| 25 | 490 | 100+ | 82 | 1.17 | 1.95 | 1 |
| 26 | 580 | 100+ | 93 | 0.14 | 0.97 | None |
| 27 | 400 | 96 | 85 | 1.13 | 1.93 | 18 |
| 28 | 430 | 89 | 83 | 0.96 | 1.96 | 6 |
| 29 | 460 | 96 | 84 | 0.93 | 2.82 | 3 |
| 30 | 490 | 92 | 85 | 0.96 | 3.00 | 1 |
| 31 | 550 | 100+ | 96 | 0.16 | 6.31 | None |
| 32 | 610 | 100+ | 100+ | 0.16 | 13.13 | " |

Rolls produced according to the invention will have a comapcted roll body density in the range of about 430 to about 600 kg/m$^3$. Rolls having a lower density, e.g., on the order of 400 kg/m$^3$ will deform readily without adequate recovery. The depth of deformation of the roll periphery is measured by the fatigue Test described above. Rolls having an insufficient density may be readily determined by the Fatigue Test because they will have fatigue value in excess of about 10 mm.

A roll of a higher density, e.g., on theorder of 610 kg/m$^3$, or higher, will deform under localized compaction, as sometimes is encountered in use when an unusually thick piece of material passes beneath the roll, and not readily return to its original dimensions when the unusually thick piece of material is passed. If such a return does not occur, the roll will thereafter pass undesirably large quantities of liquid instead of squeegeeing it from the surface of subsequently inserted material of normal thickness. This inability to return to the original dimension or inability to "heal" is determined by the Squeegeeing Efficiency Test described above. Rolls which permit the passage, after deformation or damage, of more than about 10 grams of water during this test are excessively compacted and thus not within the scope of the invention.

I claim:

1. A roll especially suited for stripping harsh aqueous chemical solutions from the surface of metal sheet, said roll comprising a cylindrical body supported on its cylindrical axis for rotation, said body comprising a compacted pile formed of a multiplicity of like-oriented disc elements of nonwoven, randomly laid, entangled, fibers formed of chemically resistance polyolefin, said compacted pile having a density of about 430 to about 600 Kg/m$^3$.

2. The roll of claim 1 wherein said disc elements are formed of air laid crimped staple fibers.

3. The roll of claim 1 wherein said disc elements are a spun bonded non-woven fabric.

4. The roll of claim 3 wherein said spunbonded non-woven fabric comprises polypropylene.

5. The roll of claim 2 wherein said fibers are felted by needling.

6. The roll of claim 1 wherein said polyolefin is selected from the group consisting of polypropylene, polyethylene, and polybutylene.

7. The roll of claim 1 wherein said cylindrical body is supported on a shaft which passes through the center of said disc elements.

8. The roll of claim 1 wherein said shaft is keyed to prevent rotation of said disc elements on the shaft.

9. The roll of claim 1 including an adhesive binder which bonds adjacent fibers together with a chemically resistant bond at points of contact.

10. The roll of claim 9 wherein said adhesive binder is a thermoplastic binder.

11. The roll of claim 7 including flanges on either end of said cylindrical body mechanically fastened to said shaft to provide the compaction force.

12. The roll of claim 1 wherein said roll has a Fatigue Test result of less than 10 mm and a Squeegeeing Efficiency Test result of less than 10 grams of water.

13. The roll of claim 1 wherein said polyolefin fibers have a tenacity greater than about 1 gram per denier.

14. The roll of claim 1 wherein said polyolefin fibers have a size on the order of 1 to 50 denier.

* * * * *

UNITED STATES PATENT AND TRADEMARK OFFICE
CERTIFICATE OF CORRECTION

PATENT NO. : 4,669,163
DATED : June 2, 1987
INVENTOR(S) : Ronald E. Lux and Eugene J. Miller It is certified that error appears in the above-identified patent and that said Letters Patent is hereby corrected as shown below:

Column 2, line 11, after "heated" insert --and--.
Column 2, line 12, "Poisson,s" should read --Poisson's--.
Column 5, line 6, "adhesives(" should read --adhesives--.
Column 5, line 15, "$punbonded" should read --Spunbonded--.
Column 7, line 45, after "coated" insert --on--.
Column 8, line 24, "symmericaly" should read --symmetrically--.
Column 8, line 27 "finsihed" should read --finished--.
Column 9, line 16, "deressed" should read --dressed--.
Column 10, line 44, "comapcted" should read --compacted--.
Column 10, line 48, "fatigue" should read --Fatigue--.
Column 10, line 52, "theorder" should read --the order--.
Column 11, line 7, "resistance" should read --resistant--.

Signed and Sealed this

Third Day of May, 1988

*Attest:*

DONALD J. QUIGG

*Attesting Officer*  *Commissioner of Patents and Trademarks*